Nov. 19, 1963    L. SHELTON ET AL    3,111,150
EGG BREAKING HEAD
Filed Oct. 9, 1961    4 Sheets-Sheet 1

Inventors
Leonard Shelton
Ralph N. Beebee
Thaddeus J. Tworek
By Schneider, Dressler, Goldsmith & Clement
Attorneys.

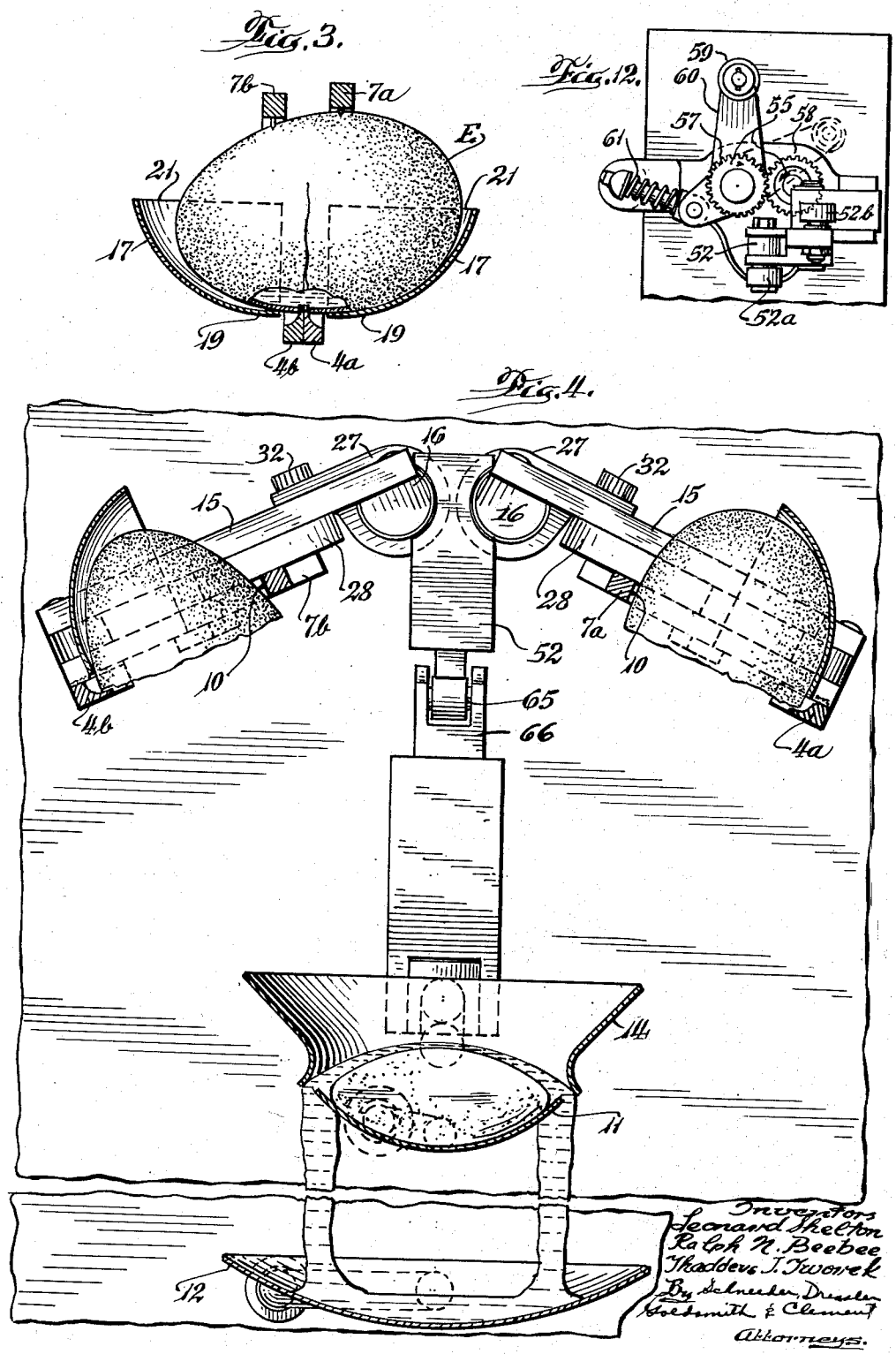

Nov. 19, 1963 L. SHELTON ET AL 3,111,150
EGG BREAKING HEAD
Filed Oct. 9, 1961 4 Sheets-Sheet 3
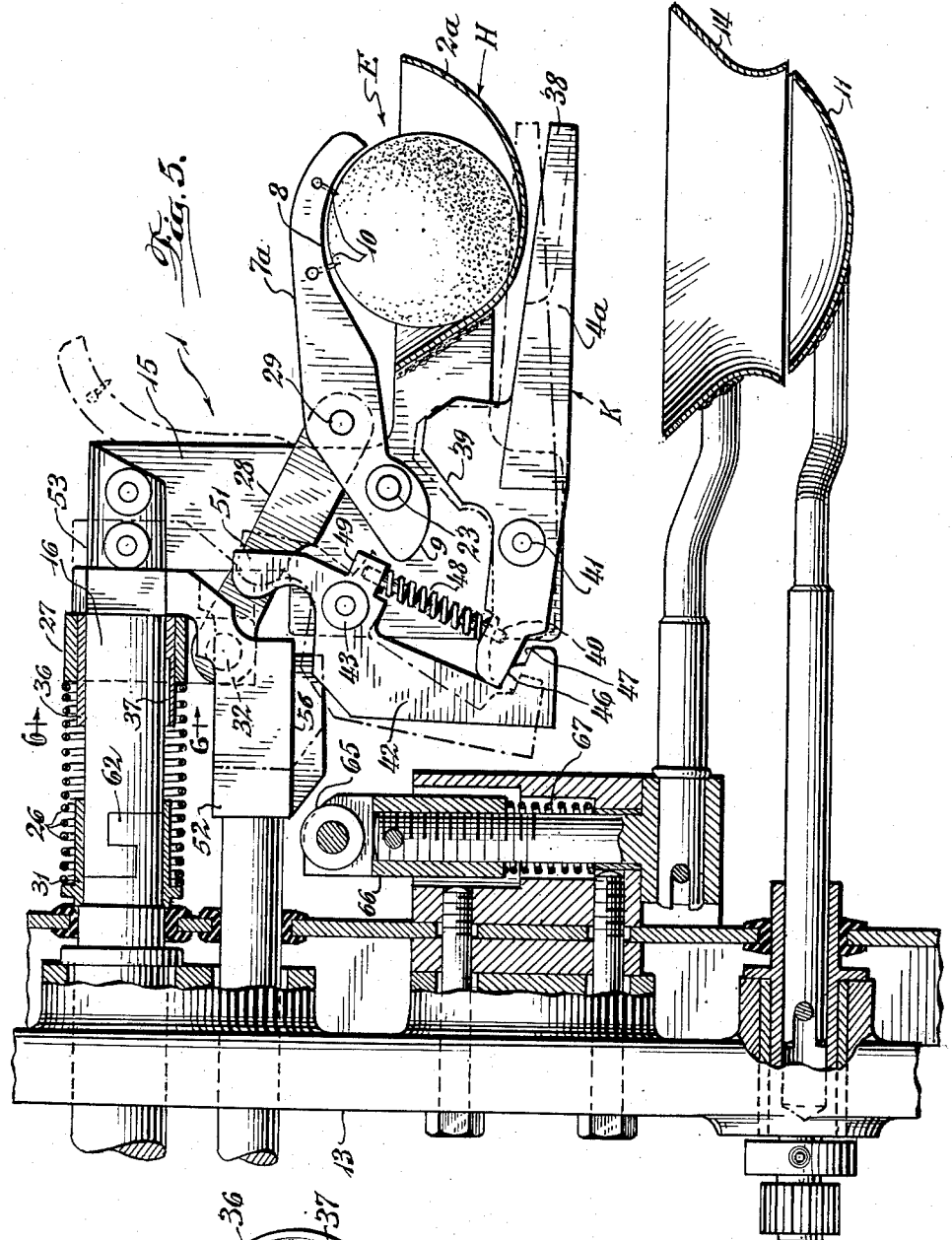
Inventors
Leonard Shelton
Ralph N. Beebee
Thaddeus J. Tworek
By Schneider, Dresler, Goldsmith & Clement
Attorneys.

Nov. 19, 1963    L. SHELTON ET AL    3,111,150
EGG BREAKING HEAD
Filed Oct. 9, 1961    4 Sheets-Sheet 4
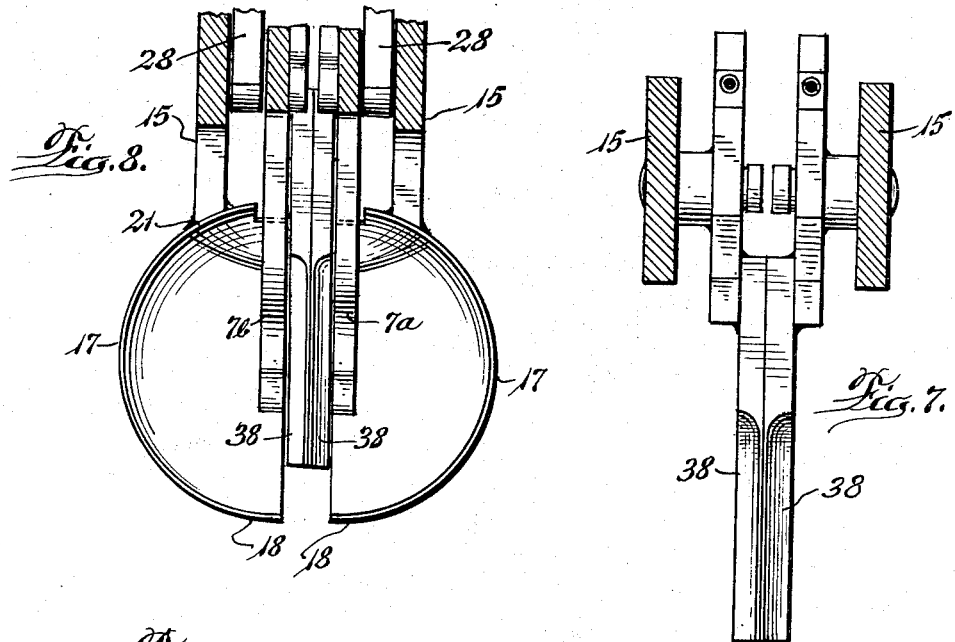
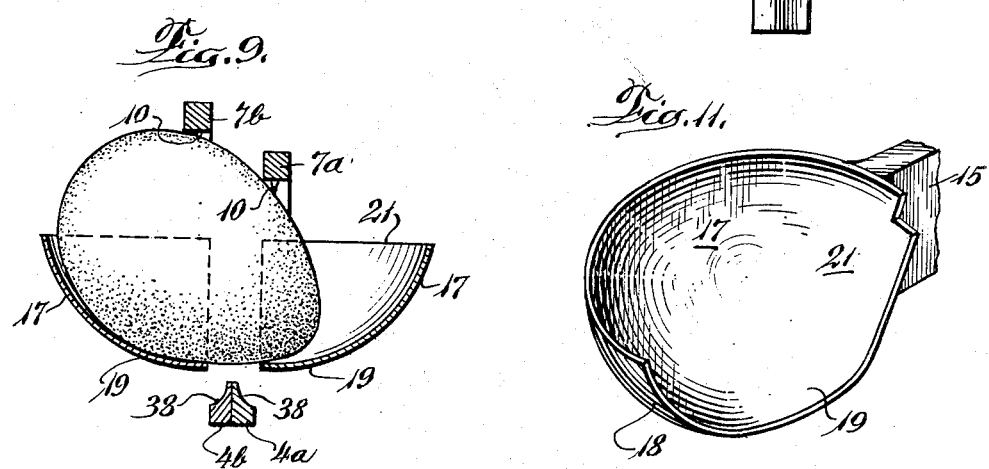
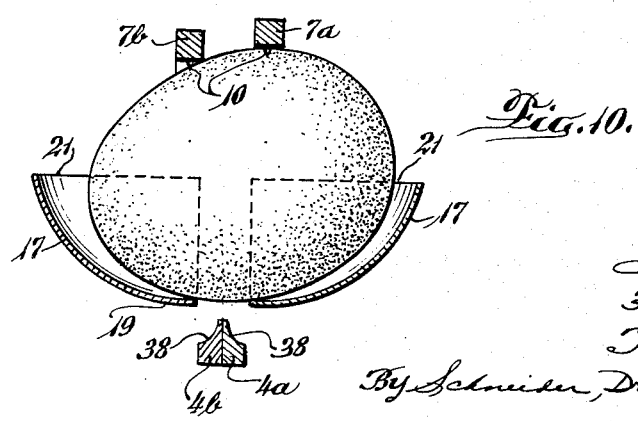

United States Patent Office 3,111,150
Patented Nov. 19, 1963

3,111,150
EGG BREAKING HEAD
Leonard Shelton, 7709 Poppleton Plaza, Ralph N. Beebee, and Thaddeus J. Tworek, all of Omaha, Nebr.; said Beebee and said Tworek assignors to said Shelton
Filed Oct. 9, 1961, Ser. No. 143,850
5 Claims. (Cl. 146—2)

This invention relates to an assembly for breaking open and emptying the contents of an egg, particularly to an egg breaking head which will handle substantially all eggs regardless of their size, shape, or condition of the shell.

The procedure for breaking open and collecting the contents of eggs for baking or other uses has evolved over the years from a strictly manual operation through single egg cups with an attached cutter to relatively complicated structures that are capable of handling large quantities of eggs. This active development has resulted from an increased demand for egg yolks and egg albumen for use in the baking and other food fields. These latter mechanisms while capable of handling large quantities of eggs were only usable with eggs of a given range of sizes and shell conditions. These limitations resulted from the egg holding devices that were used and the clamping mechanisms employed to hold the eggs in place during conveying and the egg cutting operation. Thus, these machines required that the eggs be sorted and the damaged or cracked eggs removed before they are placed in the egg holder to insure that most eggs would be held in place during the cutting operation. Egg shapes and sizes that fell outside the prescribed range were likely to be broken or smashed by the clamping mechanism when an attempt was made to lock them in place in the holder. If such eggs were not damaged when contacted by the clamping mechanism they would very likely be discarded before the cutting operation with the resultant loss of egg meat or the shells would be shattered and shell fragments would be found with the egg contents.

Another disadvantage to those machines presently on the market is that the egg yolks are very often broken during the cutting operation. This results from the fact that the holding, clamping, and cutting mechanism of such prior art devices do not positively locate all the eggs placed in the egg holder in a given position relative to the knife so that during the cutting operation only the egg shell would be cut.

In addition to being limited to eggs of a given size and shape, the previous machines would only work with unbroken eggs. Cracked eggs or "leakers" could not be successfully handled since the forces applied to hold the egg in position would crush the already damaged egg with obvious results. Another problem presented by some egg machines now in use is that the egg breaking assemblies are not readily removable for the cleaning and replacement of parts without disassembling a large portion of the machine.

In accordance with the present invention, there is provided an egg breaking head that is capable of handling all sizes and shapes of eggs regardless of the position they take in the egg holding assembly. After the egg is located in the egg holder in a random fashion, the egg is held in place by a clamping arrangement which holds the eggs securely in position with a minimum force so that the egg shell is not crushed. The forces imposed are so small that cracked or leaking eggs will not be further damaged by the clamping assembly and can be broken and separated. The egg holder consists of egg-cup-halves that are spaced apart to admit a knife therebetween for cutting the egg shell. The clamping arrangement for holding the egg in place against upward movement includes a pair of independently movable arcuate-shaped fingers. The fingers are fitted with pins having sharp points extending downward from the arcuate undersurface of the fingers. These points engage the shell in order to insure shell retention. Eggs of various sizes and shapes are clamped in place in the egg holder by the fingers which engage the upper surface of the egg and hold it either between the points of the finger and the bottom of the cup, or between any one point of either fingers and the surface of the bottom and back walls of the egg holder.

After the egg is clamped in place, a knife located below the cup holder and between the adjacent egg-cup-halves, having been previously cocked, is tripped to pierce the undersurface of the egg shell an amount sufficient to crack the shell but not to break the egg yolk. The combination of the egg clamping action and the snap action and shape of the knife prevents the egg shell from shattering and mixing portions of the shell fragments with the contents in the egg. After the egg has been cracked, the splitting of the egg shell is completed by moving the cup halves and associated halves of the egg shell away from each other to drop the egg contents into a cup for collecting the entire egg contents or into a separating mechanism disposed below the egg-cup-halves for separately collecting the egg yolk and egg albumen. The egg contents so collected can then be dumped into separate containers or the egg yolks and whole egg can be combined in whatever proportions desired to form a blend if such is desired. The halves of the egg shell are held in place in each egg-cup-half by an associated finger and half of the knife blade. After the contents have been dumped from the shell, the egg holding finger is retracted and the knife recocked to release the egg shell from the egg-cup-halves into a shell chute. After the shells drop, the egg-cup-halves are brought back together, and the fingers are lifted to allow the egg-cup-halves to receive another egg.

The structure by which the above and other advantages of the invention are attained will be described in the following specification, taken in conjunction with the accompanying drawings illustrating a preferred structural embodiment of the invention, in which:

FIGURE 3 is a front cross-sectional view showing an egg clamped in place in the cup being severed by the knife;

FIGURE 4 is an enlarged front view of the egg breaking head with the egg-cup-halves moved apart and the contents separately collected in a yolk cup and an albumen cup disposed below the egg-cup-halves;

FIGURE 5 is a cross-sectional view taken along lines 5—5 of FIGURE 2 with the knife and associated actuating mechanism being illustrated in their positions both before and after the egg shell is cracked;

FIGURE 6 is a cross-sectional view taken along lines 6—6 of FIGURE 5;

FIGURE 7 is a sectional view taken along lines 7—7 of FIGURE 1;

FIGURE 8 is a sectional view taken along lines 8—8 of FIGURE 1;

FIGURES 9 and 10 illustrate how eggs of different sizes and shapes are held in place in the egg cup;

FIGURE 11 is a view in perspective of one of the egg-cup-halves; and

FIGURE 12 is a view taken along lines 12—12 of FIGURE 1.

Figure 1:
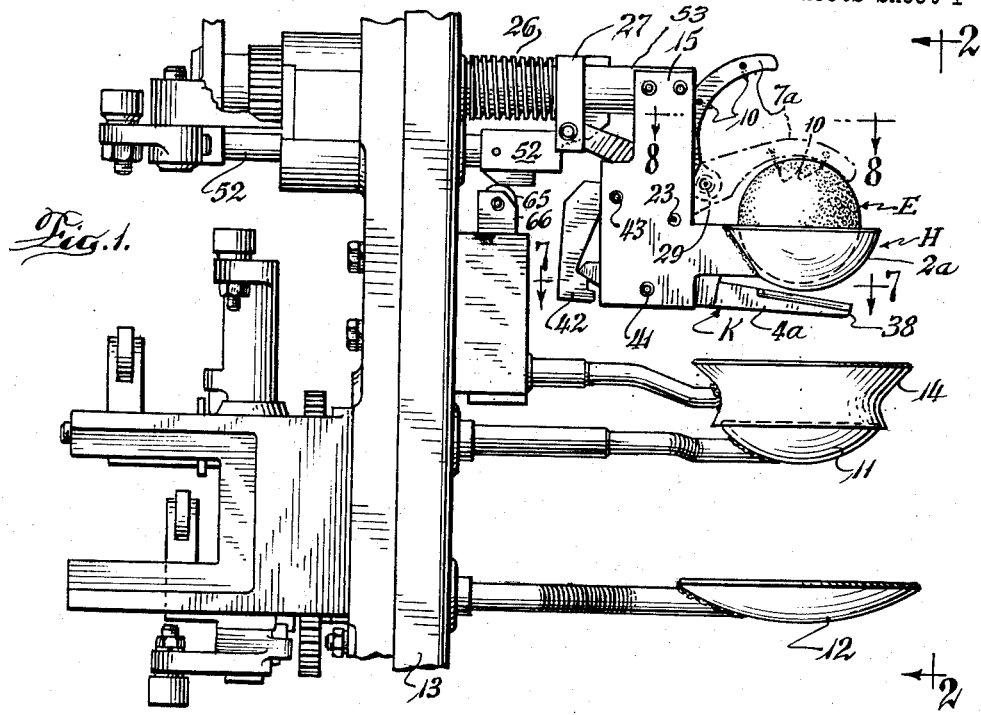
FIGURE 1 is a side elevational view of an egg breaking head plus means for separating the egg contents.
Figure 2:
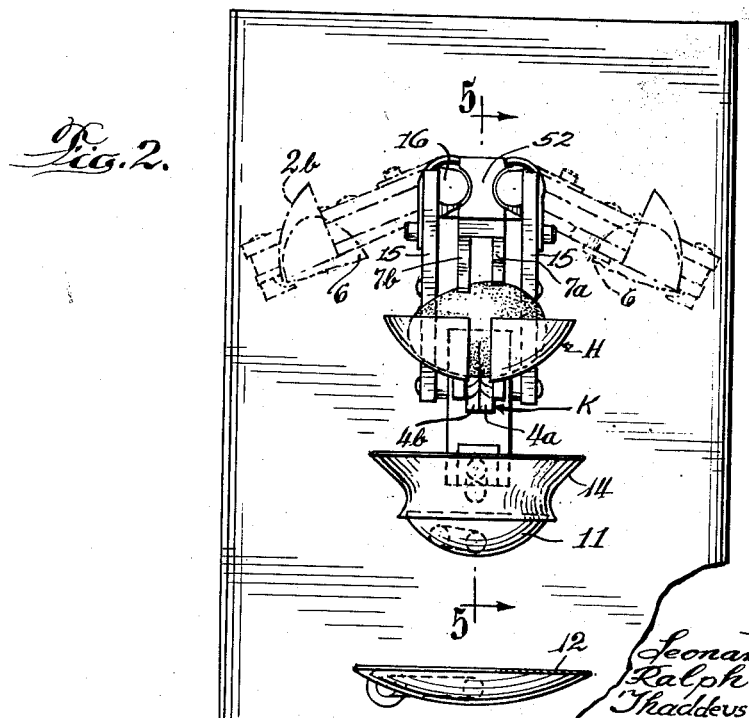
FIGURE 2 is a front view taken along lines 2—2 of FIGURE 1, plus a view in phantom showing the position of the egg-cup-halves during the egg dumping operation.

Referring first to FIGURES 1, 2, and 4, there is illustrated an egg breaking head and a separating assembly that receives an egg E in an egg holder H, cracks the egg shell, splits and separates the egg shell to drain the contents therefrom, and separates and collects the egg yolk and egg albumen in separate receptacles.

The egg holder H is made up of two egg-cup-halves 2a, 2b that are slightly spaced apart to permit the entry of a knife K, made in two halves 4a, 4b, to cut the egg shell 6 with a sharp snap action so that the egg shell 6 is not shattered. The egg E is held in place in the egg cup assembly by a pair of resiliently loaded, independently movable fingers 7a, 7b. Fingers 7a, 7b each have two sharp pointed pins 10 which extend downwardly from an arcuate undersurface 8 of the fingers into engagement with the upper surface of the egg. The egg received in the egg holder is held in place either between the points of at least one finger and the bottom of the cup, or between any one point of either finger and the surfaces of the bottom and back walls of the egg holder so that substantially all eggs regardless of their size or shape will be held in a certain fixed relationship relative to the knife K to insure that the cutting movement of the knife K will cut through the egg shell 6 but will not pierce the egg yolk membrane and break the egg yolk and mix the egg yolk with the egg albumen. The design of the egg cup and egg fingers whereby this is accomplished was discussed briefly above and will be described in detail hereinafter.

Located immediately below the egg-cup-halves is an egg yolk cup 11 and below that is an egg albumen cup 12. These cups are removably mounted relative to a main support member 13. When the egg shell 6 has been cracked and the cup halves 2a, 2b moved away from each other with a portion of the egg shell as shown in FIGURE 4, the egg contents fall freely toward the yolk cup 11. The yolk cup 11 retains the egg yolk and the egg albumen drains off into the albumen cup 12. A vertically adjustable funnel-shaped clipping cup 14 located above the yolk cup 11 is moved into engagement with the yolk cup to guide the contents of the egg toward the yolk cup and to clip off the egg albumen that adheres to the egg yolk to obtain a greater separation of the egg albumen from the egg yolk. The upper diameter of the clipping cup is large enough to insure that the contents dropped from the egg contact the inner wall surface of the funnel portion so that the egg yolk will not be broken. The yolk and albumen cups are subsequently rotated to dump the egg yolk and egg albumen in suitably placed containers. The movement of the clipping cup takes place during the resetting of the knife and egg clamping fingers as will be discussed hereinafter. The yolk, albumen, and clipping cups are illustrated by way of example only since they can be replaced with one large cup for collecting the entire contents of the egg, if desired.

The egg breaking head, to which this application is directed, includes two rotatably mounted complementary sub-assemblies that are identical except the parts that are not symmetrical and are located on opposite sides. In the latter situation, the parts are identical but of opposite hand.

When the sub-assemblies are joined together, they form an egg holder, an egg clamping means, and an egg cutting means. For ease of description, the corresponding parts of each sub-assembly will be given the same number except in the case of the egg-cup-halves, clamping fingers, and knife halves which will be given the letters "a" and "b" to indicate that they are part of one sub-assembly or the other. For example, both knife latches will have the same number, whereas the two cup halves will be referred to as 2a, 2b. However, where only one is referred to, the letter "a" will be used.

Each of these sub-assemblies includes an egg-cup-half 2a that is secured to a vertical support plate 15 which is in turn secured at its upper end to a longitudinally extending shaft 16 that is rotatably mounted in the main support member 13.

As shown in detail in FIGURES 2, 3, 9, and 10, the two egg-cup-halves when placed in a complementary relationship are capable of holding eggs of varying sizes and shapes in whatever position the egg is received. Each egg-cup-half is made up of concave side, front, and bottom walls 17, 18, and 19, respectively. The side wall 17 and front wall 18 are rounded and the bottom wall 19 is only slightly curved or dish-shaped. The bottom wall 19 joins with a substantially flat back wall 21 at an angle on the order of 125° (see FIGURE 11). The flat back wall is provided so that the cup is capable of receiving eggs of substantially all sizes and shapes. In essence, the flat back "opens" the mouth of the egg holder to insure that all eggs placed in the egg holder will come to rest in the bottom portion of the egg-cup-halves. The angular relationship between the flat back wall and bottom wall recited hereinbefore is intended to be exemplary only and is not to be considered limting. When the two half cups 2a, 2b are in the egg holding position, an egg holding cavity is formed which in a horizontal plane is in the form of an ellipse and a vertical section through the space 22 between the cup halves 2a, 2b would approximately form a semi-circle. This general cup shape design in combination with the clamping fingers to be described hereinafter locates substantially every egg disposed therein in position to be cut by the knife K an amount necessary to crack and hold the egg shell but not sufficient to break the egg yolk. Essentially, an egg will be contacted at three places in at least one cup-half. That is to say, an egg E disposed in cup half 2a will be held between the two points 10 of the clamping finger 7a and the bottom wall 19 of the cup half or between one of the points 10 and points on the bottom wall 19 and back wall 21 adjacent the juncture of the back and bottom walls. If the eggs are somewhat symmetrical and located in a central position in the cup, they will be contacted at three places in both cup halves. If the egg is not symmetrical, it will be contacted at three places in one cup half and only two places in the other. The egg clamping finger 7a is pivotally mounted by a pivot pin 23 to the support plate 15. The egg fingers 7a, 7b for clamping the eggs in position in the egg cup are shaped as shown in FIGURES 1 and 5 and include, as previously mentioned, spaced sharp pin 10 that extend downwardly from the ends of the arcuate undersurface 8 of the fingers. The points of pins 10 are adapted to contact the upper surface of the egg shell to clamp the egg in place in its respective cup half. The protrusion of the points is limited so they will not prevent the shell from dropping after the contents of the egg have been emptied. With this construction, eggs of various shapes and sizes are clamped in place in the egg holder by the fingers which engage the upper surface of the eggs and hold it either between the points of at least one of the fingers and the bottom of the cup, or between the forward point of either finger which engages a front portion of the upper surface of an egg and areas on the bottom and back walls of an egg-cup-half adjacent their juncture. The fingers 7a, 7b move independently of each other and thus they will clamp any size or shape egg in position in the egg-cup-halves.

Examples of different eggs being clamped in place are shown in FIGURES 1, 2, 3, 9, and 10. With all the eggs being placed in this position, the knife K disposed in the space 22 between the egg-cup-halves will cut into each egg approximately the same amount. The depth of cut is set so that the egg shell will be cracked but the egg yolk membrane will not be pierced. With further reference to the shape of the finger, it is noted at this time that each of the fingers 7a, 7b defines at its rear end a cam surface 9 which functions to reset the knife K when the fingers are moved out of contact with the egg shell after the egg shell has been broken and the contents emptied. This will be discussed in detail hereinafter when describing the structure and operation of the knife and complete breaking head.

The finger 7a is resiliently biased in the clamping direction by a compression spring 26 acting through a sleeve 27 and a link 28 that is secured by pin 29 to the finger 7a forwardly of pivot pin 23. The compression spring 26 surrounds the shaft 16 and is located between a sleeve guard 31 and the sleeve 27. The link 28 is connected at one end by a pin 32 to an arm 33 which extends downwardly from sleeve 27 and at its other end by pin 29 to an intermediate portion of finger 7a. The mechanical advantage of this arrangement is such that a relatively light compression spring can be used. With this arrangement, the forces acting on the egg are not such as to shatter the egg shell and thus the breaking head can handle cracked and leaking eggs as well as unbroken eggs.

Movement of the clamping finger 7a away from the egg is prevented by a friction lock arrangement which prevents movement of the sleeve 27 relative to the shaft 16, except by a force acting in the axial direction. This locking action is accomplished by providing sleeve 27 with a bushing 36 which has an inner surface 37 surrounding the lower half of the shaft 16 that is undercut as shown in FIGURES 5 and 6. Thus an upward force on the finger 7a acts through the link 28 and sleeve 27 to move the undercut surface 37 into contact with the lower surface of shaft 16 to bring about a binding action between the bushing 36 and shaft 16 to lock the clamping finger in position. However, as will be obvious from the drawings, a force exerted in an axial direction against the sleeve 27 and spring 26 will rotate the finger away from the egg in the egg-cup-halves.

The knife K for cutting the shell of the egg located in the egg holder H is located in the space 22 provided between the cup halves 2a, 2b and consists of knife halves 4a, 4b that are pivotally mounted to their respective support plates 15. The cutting end 38 of the knife halves is formed by hollow grinding each knife half on a radius along a portion of the length of the knife as shown, for example, in FIGURES 7 and 9. The concave surface so formed also functions to hold the lower portion of the egg shell from slipping out of each cup half after the egg shell has been cut. The knife has a flat cutting edge which is desirable to obtain the necessary shell cutting effect but which will not break the membrane of the egg yolk. It remains to note that each knife half defines a rearwardly inclined cam surface 39 which is positioned to be engaged by the cam surface 9 defined by the rear end of the clamping fingers and an end portion 40 which cooperates with the knife latch. These features will be discussed in detail when describing the latching and resetting mechanism and in the method of operation.

The knife half 4a is pivotable about pin 41 and is held out of contact with the egg yolk by a knife latch 42 that is pivotally secured to vertical support plate 15 by pin 43. The knife latch 42 defines at its lower end an upper step 46 adapted to support the knife half 4a in the latched or cocked position and a lower step 47 which functions to limit the travel of the knife half 4a relative to the egg holder H (see FIGURE 5 for the relative positions of the knife and latch in the cocked and uncocked position). A compression spring 48 located between a latch projection 49 and the rear end 40 of the knife half 4a is provided to bias knife half 4a counterclockwise about pin 41. The top or knife latch 42 is in the form of an upwardly extending finger 51 which is positioned to be engaged by a rod 52 to move knife latch 42 in a clockwise direction about pin 43. The positioning of rod 52 occurs through the action of a cam or other actuating means (not shown) which engages rollers 52a, 52b, that are secured to the rear end of rod 52, in the desired sequence as will be described hereinafter. Forward movement of rod 52 brought about by the engagement of actuating means with roller 52a rotates latch 42 so that the upper step 46 is moved out of engagement with the knife half 4a to permit the spring 48 to move the knife half 4a into cutting engagement with the egg. The movement of the knife half 4a is limited by the engagement of end 40 of the knife half with the lower step 47 of latch 42. In addition to tripping the knife half 4a by engagement with the latch finger 51, the rod 52 when moved in the opposite direction by cam means engaging roller 52b, functions to raise the fingers 7a, 7b and reset the knife halves by bringing the cam surfaces 9, 39 into engagement. Briefly, when the fingers are raised, the cam surface 9 engages knife surface 39 to rotate knife halves 4a, 4b clockwise to bring knife end 40 into engagement with the upper step 46 of latch 42. To accomplish this function, the rod 52 includes an upwardly extending projection 53. The projection 53 surrounds the shafts 16 and engages the sleeves 27 to exert an axial force thereagainst (see FIGURES 2 and 5). The sleeves 27 are free to move relative to the shafts 16 and such movement rotates fingers 7a, 7b away from the egg-cup-halves.

The rod 52 also defines, at an intermediate portion, a cam surface 56 that engages a roller 65 that is secured to a carrier 66 for the clipping action by the cup 14. The carrier is normally biased upwardly by the spring 67. When the cam surface 56 engages roller 65, the clipping cup 14 is moved to the position shown in FIGURES 1 and 2 to clip the egg albumen from the egg yolk.

As previously mentioned, the shafts 16 of each of the sub-assemblies are rotatably mounted relative to the main support casting 13. After the shell of the egg in the egg cups 2a, 2b has been cut, the shafts 16 of the sub-assemblies are rotated in opposite directions, as indicated by arrows 55 in FIGURE 12, to divide the egg shell into two halves and empty the contents therefrom. The individual shell portions are retained in the egg-cup-half by their corresponding clamping finger and knife half (see FIGURE 4). The egg shell portions are subsequently dumped into an appropriately placed collector before yolk cup 11 and albumen cup 12 are rotated to dump the egg products. Rotational movement of the shafts 16 is effected through mating gears 57, 58 that are connected to the shafts 16 (see FIGURES 1 and 12) at their ends opposite vertical plate 15. This rotational movement of the shafts 16 is obtained through the action of a cam or other actuating means that engages a roller 59 secured to an arm 60 that is connected to one of the shafts 16. A spring loaded over center toggle assembly 61 is provided to hold the egg cup sub-assemblies in their separated position during the shell disposal period and to assist in returning them to the receiving position as shown in solid lines in FIGURE 2 by the action of another cam that engages roller 59 to positively return arm 60 to an upright position and thereby rotate shafts 16 back to their normal position.

With further reference to the sub-assemblies, it is to be noted that shafts 16 are each in two parts that are interconnected at 62 to prevent axial movement therebetween, but such interconnection provides for quick removal of essentially the entire sub-assembly for cleaning or repairing.

The method of operation of the egg breaking head is as follows:

When the breaking head is in position to receive an egg, the fingers 7a, 7b are raised and the knife K is latched out of engagement with egg holder H as shown in solid lines in FIGURE 1.

After the egg has been dropped in the egg-cup-halves 2a, 2b, a cam or other actuating means engages roller 52b to move the finger rod 52 along with projection 53 forwardly out of engagement with sleeves 27 to permit the compression springs 26 to bias the sleeves 27 and links 28 in a forward direction. This forward movement of link 28 rotates the clamping fingers 7a, 7b about pivot pin 23 into a position where the sharp points 10 extending from the undersurfaces 8 of the fingers are placed in engagement with the upper surface of the egg. The resiliently loaded clamping fingers 7a, 7b act on the egg to clamp it either between the points 10 of either finger and the bottom of the cup, or between the forward point of either finger and the back and bottom walls 21, 19, respectively, of the egg-cup-halves 2a, 2b. This three-point clamping action will securely hold substantially all sizes and shapes of eggs in the egg holder.

After the egg has been clamped in position, the finger rod 52 is moved forwardly an additional amount by a cam or other actuating means acting against roller 52a to bring the rod 52 into engagement with the upper arm 51 of the knife latch 42 to rotate it clockwise into the unlatched position. Movement of latches 42 in the unlatched direction (clockwise in FIGURE 5) moves the upper latch step 46 out of engagement with the ends 40 of the knife halves 4a, 4b. When this takes place, the springs 48 disposed between the latch projection 49 and knife ends 40 biases their respective knife halves through the space 22 between the egg halves 2a, 2b into cutting engagement with the egg shell. The travel of the knife is limited by engagement of the knife ends with the lower step 47 of the knife latch 42. This results in a sharp, quick cutting action by the knife which prevents the egg shell from shattering. The relationship between the clamping action of the fingers, the shape of the cup holder, the shape of the cutting edge, and cutting movement of the knife cooperates to cut all eggs within a given area and an amount so that the egg shell will be cut but the egg yolk membrane will not be pierced. The egg is held securely in place during the cutting operation since upward movement of the egg fingers is prevented by the friction lock formed between the bushings 36 and shafts 16. After the egg has been cut, a cam or other actuating means is brought into engagement with the roller 59 to rotate the arm 60 and mating gears 57, 58. This operation of the gears moves the sub-assemblies away from each other, as shown in FIGURE 4, to separate the egg shell portions disposed in each egg-cup-half to dump the contents of the egg. The separating motion of the sub-assemblies completes the breaking of the egg by gripping the portion of the egg in each cup half between the cup half, knife half, and associated finger and ripping the shell apart along the circumference of the egg leading from the cut portion.

The contents of the egg fall into the egg yolk cup 11 and the egg albumen flows over the egg yolk which is held in the yolk cup into the egg albumen cup 12 disposed below the egg yolk cup. The clipping action of the clipping cup 14 takes place during the resetting operation of the breaking head which will be described below.

After the egg shell portions have been separated and the egg contents emptied, the finger rod 52 is moved rearwardly by a cam engaging roller 52b to dump the egg shell and reset the breaking head to the egg receiving position shown in FIGURE 1. This resetting action takes place as follows: The rearward movement of rod 52 moves projection 53 into engagement with sleeves 27 to move them against the action of springs 26. This rearward movement of sleeves 27 carries along with its links 28 that are connected to clamping fingers 7a, 7b. The links 28 rotate the fingers 7a, 7b out of engagement with the egg shell 6. When the fingers 7a, 7b are moved upwardly, the cam surfaces 9 of the fingers are brought into contact with the inclined surfaces 39 of the knife halves to recock the knife by moving the cutting portion of the knife out of the space between the cups. This movement of the knife halves also moves the ends 40 of the knife out of engagement with the lower step of latch 42 and through the compression action of springs 48 moves the upper step of latch 42 under knife ends 40 to hold the knife in the latched position. When the egg holding finger is retracted and the knife is recocked the egg shell will drop from the egg-cup-halves into a suitably located shell chute.

Further rearward movement of the rod 52 brings cam surface 56 into engagement with the roller 65 to move the carrier assembly 66 downwardly to bring the clipping cup 14 into engagement with the yolk cup to clip off the egg albumen adhered to the egg yolk. After the egg shells have been dumped simultaneously with the resetting operation, the arm 60 is engaged by suitable actuating means to return the sub-assemblies into the position shown in FIGURE 2 wherein the breaking head is again in position to receive an egg.

From the foregoing, it will be observed that numerous variations and modifications may be effected without departing from the true spirit and scope of the novel concepts of the invention. For example, the egg cup could be of a different design. Also, the knife and clamping fingers may be of a shape different than that shown so long as they are capable of performing the functions intended for them. It is also obvious that various types of loading means for the clamping arrangement could be used and that the invention is not limited to the specific latching mechanism disclosed for operating the cutting means. These are but a few of the changes that could be made without affecting the the basic concepts disclosed herein.

It is intended to cover by the appended claims all such modifications and embodiments that fall within the true spirit and scope of the invention.

We claim:

1. An egg holding, clamping, and cutting assembly including cup means made up of laterally spaced complementary cup halves, resiliently loaded finger means for clamping an egg in said cup means, and cutting means disposed between said cup halves for cutting the shell of said egg, said cutting means comprising complementary knife halves each defining a flat cutting edge and a concave side surface whereby the cutting means will cut the shell without shattering and will serve to retain the egg shell portion in its respective cup half.

2. An egg breaking head comprising complementary holding, clamping, and cutting assemblies, each assembly including an egg-cup-half, a clamping finger movable relative to said egg-cup-half to hold the portion of the egg disposed therein in position relative thereto, and a knife half defining a flat cutting surface and concave side surface, whereby the shell of the egg disposed in the egg holding assembly is cut without shattering and the egg shell portions are retained in their respective halves after the shell has been split, and means for rotating the assemblies away from each other to empty the contents of the egg from the split egg shell.

3. An egg breaking assembly comprising an egg holder adapted to receive an egg made up of two laterally spaced egg-cup-halves, clamping means including a pair of fingers adapted to engage the upper surface of a portion of an egg disposed in each egg-cup-half, means for resiliently biasing the fingers into engagement with the egg in the egg holder, cutting means for severing the egg shell including two knife halves disposed below the space between the egg-cup-halves each of which defines a flat cutting edge and a concave side surface whereby the egg shell is cut without shattering and the shell portions will be held in their respective cup half, means for latching the knife out of the cutting position, rod means for tripping said latching means, and means for rotating the cup halves and associated fingers and knife halves away from each other whereby the egg shell will be split open and the contents drained therefrom.

4. An egg breaking assembly as set forth in claim 3 in which the rod means defines means for retracting the clamping fingers and resetting the knife after the contents of the egg have been emptied.

5. An egg holding and clamping assembly comprising an egg cup, resiliently biased clamping means for securely holding an egg in position in said cup including a shaft, a sleeve surrounding said shaft, a clamping finger, means interconnecting said sleeve and said clamping finger, spring means acting against said sleeve to move the finger into clamping engagement with an egg in said cup means, and means for preventing movement of the finger relative to said cup after the finger is located in the clamping position, said last mentioned means including a bushing disposed between the sleeve and shaft, which bushing defines an undercut surface that cooperates with the shaft to provide a friction lock between said sleeve and shaft.

References Cited in the file of this patent

UNITED STATES PATENTS

| | | |
|---|---|---|
| 2,031,294 | Young et al. | Feb. 18, 1936 |
| 2,314,741 | Sigler | Mar. 23, 1943 |
| 2,356,707 | Sigler | Aug. 22, 1944 |
| 2,612,921 | Tomola | Oct. 7, 1952 |
| 2,702,997 | Straszak | Mar. 1, 1955 |
| 2,966,184 | Willsey | Dec. 27, 1960 |
| 3,082,804 | Shelton | Mar. 26, 1963 |